J. Hinkley,
Connecting Ring,
N° 37,229. Patented Dec. 23, 1862.

Witnesses:
J.W. Coombs
G.W. Reed

Inventor:
Jonas Hinkley
per Munn & Co.
Attorneys

UNITED STATES PATENT OFFICE.

JONAS HINKLEY, OF NORWALK, OHIO.

IMPROVEMENT IN ADJUSTABLE LINKS.

Specification forming part of Letters Patent No. 37,229, dated December 23, 1862.

*To all whom it may concern:*

Be it known that I, JONAS HINKLEY, of Norwalk, in the county of Huron and State of Ohio, have invented a new and Improved Adjustable Link; and I do hereby declare that the following is a full, clear, and exact description of the same, reference being had to the accompanying drawings, making a part of this specification, in which—

Figure 1:
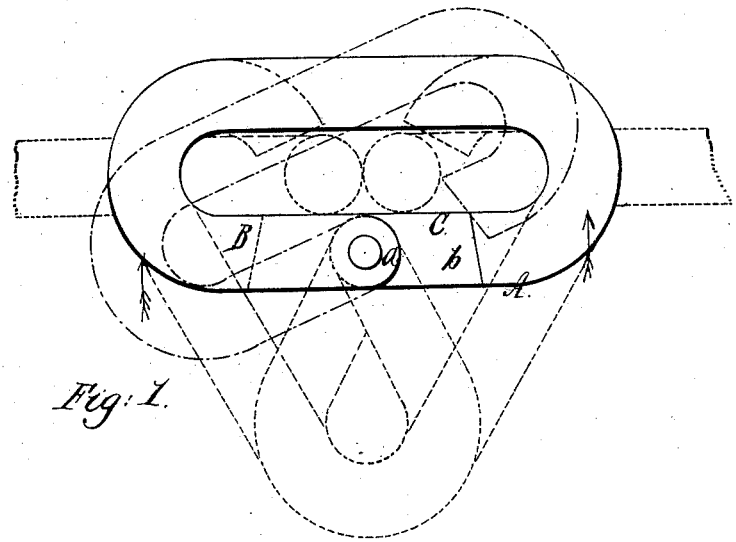
Figure 2:
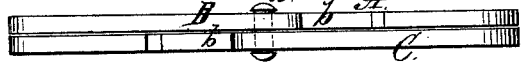

Figure 1 is a side view of my invention. Fig. 2 is an edge view of the same.

Similar letters of reference indicate corresponding parts in the two figures.

The object of this invention is to obtain a link of simple construction which may, in the case of the breaking or parting of a chain, serve as a means to connect the same and be capable of being very readily adjusted in proper position, and also capable of being detached with facility, and at the same time not be liable to become casually detached.

The invention is more especially designed for a temporary fastening to be carried by teamsters and others, for the purpose of connecting a broken chain until it can be properly repaired by a smith.

To enable those skilled in the art to fully understand and construct my invention, I will proceed to describe it.

A represents the link, which is formed of two parts, B C, of oval or an approximate form, as shown in Fig. 1. These parts B C are precisely alike both as regards form and dimensions, so that when placed in contact side by side they will coincide or be flush with each other both at their outer and inner edges. The parts B C are connected by a pivot, $a$, which passes through them at about the center of one side, as shown clearly in Fig. 1, and each part has an opening, $b$, made in it near said pivot. These openings, however, are not in line with each other. They are at opposite sides of the pivot $a$, as shown in Fig. 2. The two parts B C are allowed to turn freely on their pivot $a$, and in order to adjust the link to the two parts of a chain, so as to serve in the place of a broken link, the parts B C are turned, as shown in red in Fig. 1, so that their ends or openings $b$ will be opposite each other and admit of the end links of the broken chain being inserted, one in the part B, and the other in the part C, of the link A, and by then turning the parts B C to their original position in the direction indicated by the arrows the end links of the broken chain will be at opposite ends of the link A. When the link A is thus adjusted in the place of the broken link, the former cannot be casually detached, as the links which fit within it will prevent the parts B C from turning. In order, therefore, to detach the link A, the chain must be slackened, so that the links within it may be shoved toward the center of A past the outer ends of the openings $b\ b$. This is an important feature of the invention, for it effectually prevents the casual detachment of the link A, rendering it equally as safe when subjected to a pull or strain as if it were forged or welded in the chain like the other links which compose the same.

Another important feature of the invention, and one which distinguishes it above all others that I have seen, is that the usual link form is preserved throughout. No hook-shaped projections or curves are required in order to form the fastening between it and the parts it connects.

The link may be very cheaply constructed and of any required size, and several of them may be carried by a teamster or kept in a wagon-box underneath the seat, so as to be always ready for use.

Having thus described my invention, what I claim as new, and desire to secure by Letters Patent, is—

Having the sides of the two links pivoted together, as shown, with an opening in each link just in front of the pivot, all as herein set forth.

JONAS HINKLEY.

Witnesses:
E. A. PRAY,
DAVID T. HALL.